United States Patent [19]

Lopresti et al.

[11] Patent Number: 5,559,440

[45] Date of Patent: Sep. 24, 1996

[54] METHOD AND APPARATUS FOR TESTING TELECOMMUNICATIONS EQUIPMENT HAVING BOTH ANALOG AND DIGITAL INTERFACES

[75] Inventors: Philip V. Lopresti, Pennington; Steven C. Pinault, Hopewell, both of N.J.

[73] Assignee: Lucent Technologies Inc., Murray Hill, N.J.

[21] Appl. No.: 361,404

[22] Filed: Dec. 22, 1994

[51] Int. Cl.⁶ .......................... G01R 27/02; G01R 23/20
[52] U.S. Cl. ...................... 324/607; 324/158.1; 324/620
[58] Field of Search ............................... 324/158.1, 607, 324/620, 621, 622, 623, 624

[56] References Cited

U.S. PATENT DOCUMENTS

| | | | |
|---|---|---|---|
| 2,213,099 | 8/1940 | Adorjan | 324/623 |
| 2,628,266 | 2/1953 | Schroeder | 324/622 |
| 5,414,365 | 5/1995 | Coggins et al. | 324/607 |

OTHER PUBLICATIONS

S. C. Pinault and P. V. Lopresti, "Digital Characterization Techniques for the Analog Performance of Mixed-Signal Devices," *IEEE Transactions on Circuits and Systems II: Analog and Digital Signal Processing*, vol. 40, No. 8, Aug. 1993, pp. 480–492.

E. Teraoka et al., "A Built-In Self-Test for ADC and DAC in a Single-Chip Speech CODEC", International Test Conference, Oct. 21, 1993, pp. 1–18.

Primary Examiner—Ernest F. Karlsen
Attorney, Agent, or Firm—Robert B. Levy

[57] ABSTRACT

A line interface circuit ($12_1$) having a digital interface (18) and an analog interface (20) coupled to the digital interface by a transmission path (23, 26) may be tested by launching a digital value into the digital interface while the analog interface is terminated by termination impedance (35). The digital value launched into the line interface circuit is converted to an analog signal within the circuit which appears across the termination impedance, creating a voltage that is sensed back on the transmission path. This sensed voltage is converted within line interface circuit back to a digital value for output at the digital interface in response to the originally launched digital test value. The digital value generated at the digital interface of the line interface circuit in response to the test value is stored and processed by comparing the response to a reference value representing the proper operation of the line interface circuit, as derived by modeling the circuit and determining its response to conventional analog testing.

9 Claims, 1 Drawing Sheet

METHOD AND APPARATUS FOR TESTING TELECOMMUNICATIONS EQUIPMENT HAVING BOTH ANALOG AND DIGITAL INTERFACES

TECHNICAL FIELD

This invention relates to a technique for testing a piece of telecommunications equipment, such as a line interface circuit, having both an analog and digital interface.

BACKGROUND ART

Most of the telephone sets presently in use are analog in nature and serve to transmit and receive analog signals along a pair of signal lines, referred to as "tip" and "ring." By contrast, much of the equipment now employed to transmit and switch telecommunications traffic is digital in nature, thus, such equipment receives and transmits blocks of digital information. In practice, an individual analog voice terminal loop (which may be connected to one or more analog phone sets) is connected to a digital telephone switch or transmission system by way of a telephone line card.

A typical telephone line card has at least one line interface circuit that has analog interface to which the tip and ring lines of the analog loop are connected. In addition, each line interface circuit has a digital interface for connection to a digital telephone switch or transmission system. Each line interface circuit typically comprises one Analog-To-Digital (A/D) converter and one Digital-to-Analog (D/A) converter. The A/D converter converts analog input signals, received at the analog interface, to digital signals for output at the digital interface. The D/A converter converts digital input signals, received at the digital interface, to analog signals for output at the analog interface. In addition to the A/D and D/A converters, a typical line interface circuit may also include one or more amplifiers, as well as a balance circuit for canceling signals: that are reflected into the line card from the analog interface when that interface is properly terminated.

For the each line interface circuit to operate correctly, the A/D and D/A converters, as well as the amplifiers and balance circuit, must all work properly. In the past, each line interface circuit on a line card was tested to verify its operability by applying a digital value to the digital interface of the line interface circuit and then measuring, via an analog instrument, the analog signal present at the analog interface. The signal at the analog interface is then compared to a reference signal representing the proper operation of the card (i.e., operation of the line card within specified tolerances). Any fault within the D/A converter, or along the signal path between that converter and the analog interface, will manifest itself as a variation in the measured analog response signal.

The A/D converter, and the signal path between that converter and the digital interface, were tested by applying an analog test signal from an analog signal generator to the analog interface. The analog test signal was converted, via the A/D converter, into a digital signal that appears at the digital interface of the line interface circuit. The resultant digital signal was processed, and then compared to a reference value representing the proper operation of the line card. Any fault in the D/A converter, or in the signal path between the analog interface and that converter, manifested itself in terms of the digital response value appearing at the digital interface.

The above-described testing method, although effective, nonetheless incurred the disadvantage that an analog test instrument was needed for analyzing the analog response signals appearing at the analog interface during testing of the each line interface circuit D/A converter and its associated transmission path. In addition, an analog signal generator was required to test the A/D converter and its associated signal path. In practice, a typical line card may contain as many as eight, or even sixteen, separate line interface circuits, necessitating a large number of test instruments and signal generators to test all, or a majority, of the line interface circuits at once. Providing the required number of test instruments and signal generators to test individual line interface circuits on a single card in an expeditious fashion has required a large capital expense. Note that it may be possible to share the analog test instrument and analog signal generator among several line interface circuits at the expense of increasing the overall test time which is undesirable.

Thus, there is a need for a cost-effective method for expeditiously testing a line card, or other type of telecommunications equipment, containing a relatively large number of line interface circuits.

BRIEF SUMMARY OF THE INVENTION

Briefly, a technique is provided for testing a circuit (such as a line interface circuit) having a bi-directional digital interface, and a bi-directional analog interface coupled to the digital interface via a transmission path. The technique of the invention is initiated by applying to the digital interface a digitized analog signal having a spectrum content sufficient to properly characterize the transmission path. The digitized analog signal is converted within the circuit to an analog signal for transmission along a portion of the transmission path to the analog interface. (Typically, such conversion is accomplished by a D/A converter within the transmission path). The analog interface is terminated with a termination impedance that is chosen so that the analog signal transmitted on the transmission path causes a voltage to appear across the termination impedance that is capable of being sensed back on the transmission path by a A/D converter within the circuit that converts this reflected voltage to a digital signal. The digital signal is stored and processed. The processed value is then compared to a reference value that represents prescribed tolerances for the desired operating state of the circuit. The reference value is obtained by modeling the circuit and determining its response in accordance with conventional testing techniques.

DETAILED DESCRIPTION

Figure 1:
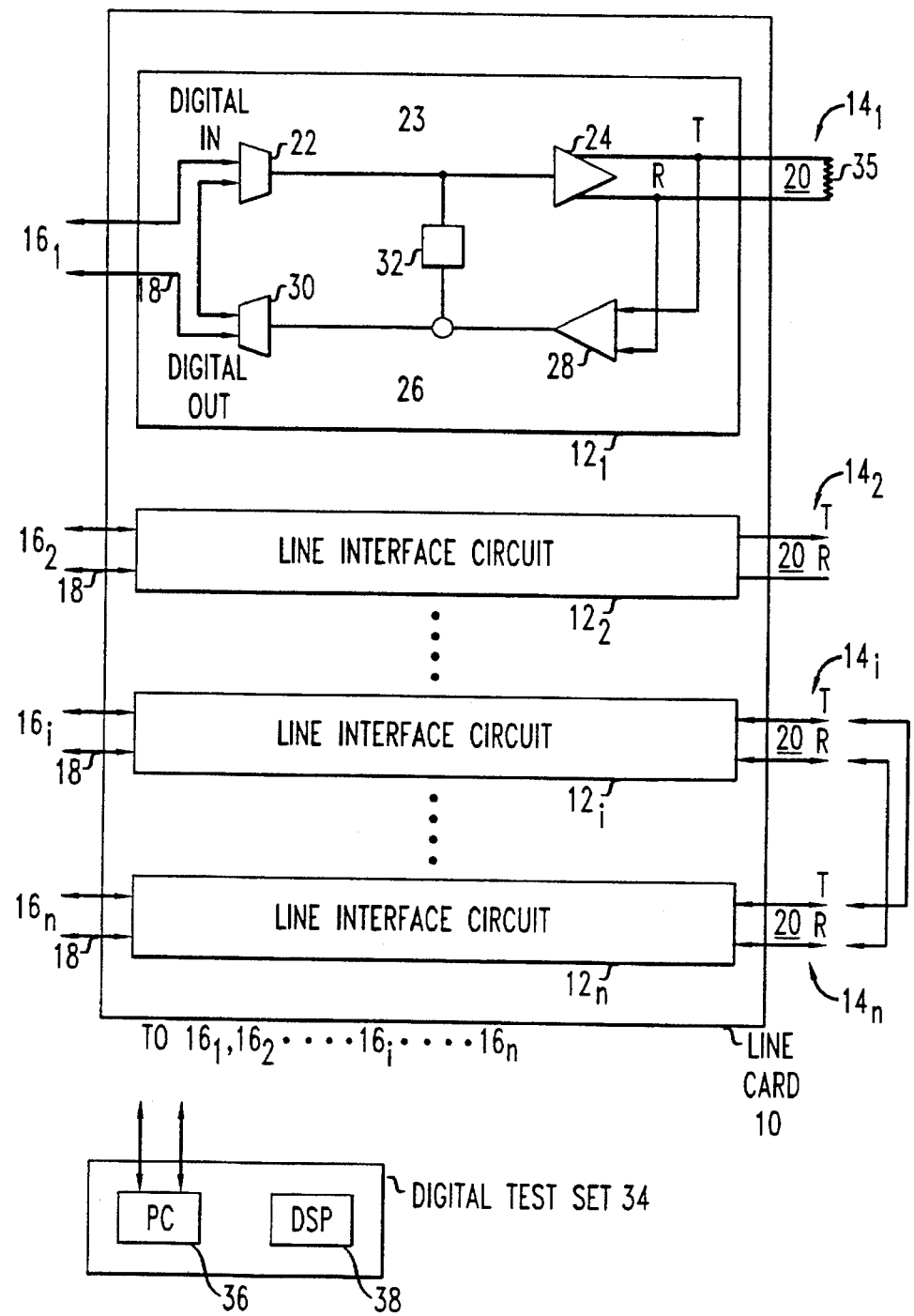
FIG. 1 is a block schematic diagram of line card for testing in accordance with the testing technique of the invention.

FIG. 1 is a block schematic diagram of a piece of telecommunications equipment 10. In the illustrated embodiment, the equipment 10 comprises a line card that caries a plurality of line interface circuits $12_1$, $12_2$ ... $12_i$ ... $12_n$ (where n and i are both integers such that n>i). Each of the line interface circuits, such as line interface circuit $12_i$, serves to interface an individual analog telephone loop $14_i$ to a corresponding digital bus $16_i$. In practice, a typical line card 10 will carry at least eight, and some times sixteen of the line interface circuits $12_1$-$12_n$.

The line interface circuits $12_1$-$12_n$ are identical in nature so that only the line interface circuit $12_1$ will be described in detail. The line interface circuit $12_1$ includes a digital interface (input) 18 coupled to the digital bus $16_1$ associated with the line interface circuit. It is through the digital interface 18 that the line interface circuit $12_1$ communicates digital information with the bus 161. The line interface circuit $12_1$ also has an analog interface 20 that communicates with an associated analog telephone line $14_1$, comprised of a tip and ring pair. Within the line interface circuit $12_1$ is a D/A converter 22 that has its input coupled to the digital interface 18 for converting digital information (in the form of blocks of digital values) received at the interface to an analog signal. The analog signal produced by the D/A converter 22 is applied to a first transmission path 23 that typically includes an analog amplifier 24. The transmission path 23 carries the analog signal generated by the D/A converter 22 to the analog interface 20 of the line interface circuit for output to the corresponding line $14_1$.

In addition to the first transmission path 23, the line interface circuit $12_1$ includes a second transmission path 26 within which is an analog amplifier 28. The transmission path 26 couples the analog interface 20 to the input of an A/D converter 30 whose output is coupled to the digital interface 18. The A/D converter 30 operates to convert analog signals present at its input to a digital signal for output at the digital interface 18.

As may be appreciated, the transmission paths 23 and 26 are coupled in parallel, and thus may be viewed as a single transmission path. Hence, a signal present on path 23 for output at the analog interface 20 will also be present on the path 26 for input to the A/D converter 30, causing a possible echo to occur. For this reason, the line interface circuit $12_1$ includes a balance (echo canceling) circuit 32 coupled between the output of the D/A converter 22 and the input of the A/D converter 30. The balance circuit 32 operates to effectively cancel most if not all of the analog signal reflected onto the transmission path 26 from the transmission path 23 when the analog interface 20 is properly terminated with an impedance matching that of the line interface circuit 121.

Proper operation of each line interface circuit requires that its individual elements function properly, that is, that each line interface circuit element operate within prescribed tolerances. In the past, each of the individual line interface circuits $12_1$-$12_n$ was tested by separately testing the transmission path 23, and its associated D/A converter 22, and then testing the transmission path 26 and its associated A/D converter 30. Such testing required the use of an analog test instrument (not shown) for measuring the analog response at the analog interface 20 upon receipt of a digital test signal at the digital interface 18. Further, an analog signal generator (not shown) was required to provide an analog stimulus at the analog interface 20 to establish a digital response at the digital interface 18 for analysis. The need to provide an analog test instrument and an analog signal generator to test each line interface circuit incurred a large capital cost to accomplish testing.

In accordance with the invention, a technique is provided for testing each of the line interface circuits $12_1$-$12_n$ without the need for an analog test instrument or an analog test generator. Rather, as will be discussed in detail, each line interface circuit $12_i$ is tested by terminating the analog interface 20 and by applying one or more digital test values at the line interface circuit digital interface 18 so that digital response values are subsequently generated at the digital interface which may then be analyzed to determine the proper operation of the line interface circuit. To accomplish such testing, a digital test set 34, and a termination impedance 35 are required. The test set 34 includes a processor 36, typically in the form of a personal computer, and a digital signal processor 38, typically in the form of a digital signal processor board coupled to the personal computer The test set 34 functions to generate the digital test values applied to the digital interface, and to store, process and analyze the subsequent digital response values generated by the line interface circuit upon receipt of the test values.

The termination impedance 35 is coupled across the tip and ring of the telephone line $14_1$ associated with the line interface circuit $12_1$ under test to terminate its analog interface 20. The nature of the termination impedance 35 and its value (in terms of its real and imaginary impedance) are selected to terminate the analog interface 20 of the associated line interface circuit $12_1$ so that an analog signal present on the transmission path 23 appears as a voltage across the termination impedance. Moreover, termination impedance 35 should have a value such that the voltage appearing thereacross is capable of being sensed at the input of the A/D converter 30 without complete cancellation by the balance circuit 32. Stated another way, the termination impedance 35 is selected so that it does not exactly match the expected termination impedance of the line interface circuit $12_1$, giving rise to a distinct mismatch.

With the analog interface 20 of the line interface circuit $12_1$ terminated by the termination impedance 35, the digital test set 34 commences testing of the line interface circuit $12_1$ by supplying to it one or more digital test values, in the form of digitized analog signals, each having a spectrum content sufficient to properly characterize each of the transmission paths 23 and 26. Typically, each digitized analog signal supplied by the digital test set 34 is produced by the digital signal processor 38. In practice, the digital signal processor 38 generates the digitized analog samples by generating digitized samples of a sinusoidal signal or a multi-tone sinusoidal signal.

Each digitized analog signal produced by the digital test set 34 is applied to the digital interface 18 of the line interface circuit $12_1$ and is converted by the D/A converter 22 within the line interface circuit to a corresponding analog signal. The analog signal produced at the D/A converter 22 is present on the transmission path 23 for output to the analog interface 20, thereby causing a voltage to appear across the termination impedance 35.

As discussed, the termination impedance 35 is selected so that there is a mismatch between the line interface circuit $12_1$ and the termination impedance. Under this condition, the voltage appearing across the termination impedance 35 is capable of being sensed on the transmission path 26 by the A/D converter 30 notwithstanding the canceling action of the balance circuit 32. While the balance circuit 32 will act to balance the transmission path 26 to reduce the level of the voltage appearing at the A/D converter 30, the balance circuit will not completely reduce the level of the voltage because of the impedance mismatch.

In accordance with voltage appearing across the termination impedance 35 (as reduced by the balance circuit 32), the A/D converter 30 generates a digital response value that appears at the digital interface 18 of the line interface circuit 121. The digital response value at the digital interface 18 of the line interface circuit $12_1$ is received and stored by the digital test set 34 for processing. During processing, the digital response value is compared to a reference value representing the expected value for the line interface circuit $12_1$ following receipt of the applied test signal. Any defect in the line interface circuit $12_1$ will manifest itself by an appreciable difference between the reference value and the digital value received from the line interface circuit at its digital interface 18.

The digital reference value used for comparison purposes is set in accordance with analog test parameters developed for the line interface circuit $12_1$ through modeling. Since the overall circuit design of the line interface circuit $12_1$ is known, the response of the line interface circuit to applied analog stimuli can be modeled mathematically. Conventional transmission tests for the line card 10 are based on direct measurements (with respect to input signals of various frequencies) of the gain of the D/A converter 22 (referred to as "D/A gain"), the gain of the A/D converter 30 ("A/D gain"), return loss, terminal balance return loss, as well as noise and distortion measurements. These parameters depend on the impedance (as measured in complex terms) of various elements in the line interface circuit $12_1$ and a common gain factor K. For ease of discussion, the impedance values can be combined to form transfer functions expressed as A (representing part of the D/A path transmission path 23), B (representing part of the A/D transmission path 26), C (representing the balance circuit 32) and R (representing the combination of $Z_T$, the termination impedance of the line card 10 during analog testing, and $Z_L$, the load applied to the line card during analog testing).

In terms of analog testing, the D/A gain ($G_{D/A}$) can be expressed as:

$$G_{D/A} = AR \tag{1}$$

whereas the A/D gain ($G_{A/D}$) can be expressed as:

$$G_{A/D} = KB \tag{2}$$

The Return Loss ($G_{RL}$) (analog-to-analog) may be expressed by the relationship:

$$G_{RL} = 20 \log 10 \left| \frac{Z_T - Z_{Tnom}}{Z_T + Z_{Tnom}} \right| \tag{3}$$

The Terminal Balance Return Loss ($G_{TBRL}$) may be expressed by the relationship:

$$G_{TRBL} = 20 \log 10 |K (A B R - C)| \tag{4}$$

with $Z_L = Z_{ETN}$, where $Z_{ETN}$ is a complex load chosen such that K (A B R −C) for a nominal circuit is nearly 0+0j.

As discussed above, in accordance with the invention, the line interface circuit $12_1$ is tested by applying a digital signal to the digital interface 18 while the analog interface 20 is terminated by the termination impedance 35 so that a digital response signal subsequently appears at the digital interface. The operability of the line interface circuit $12_1$ can thus be characterized in terms of its digital gain ($G_{D/D}$), as measured by the difference between the input digital signal and the subsequently produced response signal. The digital gain $G_{D/D}$ may be expressed by the relationship:

$$G_{D/D} = K (A B R - C) \tag{5}$$

For a line card 10 in which the balance network can be disabled, then the digital gain will be given by $$G_{D/D} = K A B R \tag{6}$$

With the all digital method of the invention, both the magnitude and the phase of the digital gain $G_{D/D}$ is of interest as compared to simply the magnitude in the case of an analog test measurement.

In order to effectively test the line interface circuit $12_1$ by measuring only the digital gain $G_{D/D}$, it is first necessary to compute a set of values $\delta A$, $\delta B$, $\delta C$, $\delta K$ and $\delta Z_T$, representing the permissible variation in A, B, C, K and $Z_T$, respectively, permitted by manufacturing test requirements. These permissible variations are computed using a single fault model in which a defective line interface circuit, such as $12_1$, is assumed to have a variation in only one of these parameters. This assumption is used in deriving the test limits as will be discussed hereinafter. This assumption is valid for a properly designed line card 10 that is made by a well-controlled manufacturing process; in such a case, failed circuits appear as outlines. Applicability of the test limits derived in this fashion to physical circuits has been validated by manufacturing trials. Note that A, B, C, K and $Z_T$ are complex quantities. Once the permissible variations in A, B, C, K and $Z_T$ have been computed, then the regions in the complex space of phase and gain are established for a good line interface circuit.

The conventional test limits for A, B, C K and $Z_T$ may be established in the following manner. For the A/D gain (expressed by the term $G_{A/D}$), the conventional upper and lower limits on the gain are given by $G_L$ and $G_U$, respectively such that:

$$G_L \leq |G_{A/D}| \leq G_U \tag{7}$$

To establish the parameter variation regions, it is useful to define a pair of terms $\epsilon_K$ and $\epsilon_B$ in accordance with the relationships:

$$\epsilon_K = \frac{\delta K}{K} \tag{8}$$

and $$\epsilon_B = \frac{\delta B}{B} \tag{9}$$

By defining the terms $\epsilon_K$ and $\epsilon_B$ in this manner, limits for the terms K and B, respectively, can be established as follows:

$$\frac{G_L}{G_{A/Dnom}} \leq |1 + \epsilon_K| \leq \frac{G_U}{G_{A/Dnom}} \tag{10}$$

and $$\frac{G_L}{G_{A/Dnom}} \leq |1 + \epsilon_B| \leq \frac{G_U}{G_{A/Dnom}} \tag{11}$$

Equations (10) and (11) yield regions for $\epsilon_K$ and $\epsilon_B$ in the complex plane in the form of an annulus, with its center at −1+0j, and having inner radius at $$\frac{G_L}{G_{A/Dnom}}$$

and an outer radius at $$\frac{G_U}{G_{A/Dnom}}.$$

The limits on the parameters A and $Z_T$ resulting from limits on the D/A gain $G_{D/A}$, such that:

$$G_L \leq |G_{D/A}| \leq G_U \tag{10}$$

can be given by the relationships:

$$\frac{G_L}{G_{D/Anom}} \leq |1+\epsilon_A| \leq \frac{G_U}{G_{D/Anom}} \quad (11)$$

and $$\frac{G_L}{G_{D/Anom}} \leq |1+\epsilon_R| \leq \frac{G_U}{G_{D/Anom}} \quad (12)$$

where $\epsilon_A$ and $\epsilon_R$ are defined using equations similar to equations (8) and (9).
Using the relationship that $$\epsilon_R \approx \frac{Z_T}{R} \frac{\partial R}{\partial Z_T} \epsilon_{Z_T} \quad (13)$$

and assuming that $Z_L = Z_L$ for a conventional test configuration, the limit on $Z_T$ can be expressed as $$\frac{G_L}{G_{D/Anom}} \leq \left|1+\frac{1}{2}\epsilon_{Z_T}\right| \leq \frac{G_U}{G_{D/Anom}} \quad (14)$$

Just as regions in the complex plane were established for $\epsilon_K$ and $\epsilon_B$, similar regions are given by equations (11) and (14) for $\epsilon_A$ and $\epsilon_{Z_T}$, respectively.

There are limits on the termination resistance $Z_T$ imposed by the return loss test. From the definition of return loss given by equation (3), the following requirement is imposed $$\left|\frac{1}{2}\epsilon_{Z_T}\right| \leq 10^{\frac{-G_{RL}}{20}} \quad (15)$$

This requirement yields a relationship for $\epsilon_{Z_T}$ in the complex plane with its center at 0+0j.

With regard to Terminal Balance Return Loss, this parameter is conventionally measured by terminating the analog interface 20 of the line interface circuit 12₁ with an impedance that matches that of the line interface circuit itself so that near total echo cancellation occurs. Under this condition, the following limit is imposed on the term $E_A$:

$$\epsilon_A \leq \frac{10^{-G_{TBRL}/20}}{|KABR|} \quad (16)$$

As may be appreciated, the term $\epsilon_A$, as expressed by equation (16), lies in a circular region in the complex plane with its center at $0+0_j$ and a radius of $$\frac{10^{-G_{TBRL}/20}}{|KABR|}$$

The terminal Balance Return Loss also imposes constraints on the parameters $\epsilon_B$, $\epsilon_C$ and $\epsilon_{Z_T}$. These constraints can be derived in a similar manner.

Having established the conventional analog parameter variation regions, the constraint regions, representing the appropriate regions for the magnitude and phase of the digital gain $G_{D/D}$, derived by processing the received digital response values, can now be established. If $G_L$, $G_U$, $\phi_L$, and $\phi_U$ represent the lower and upper limits on the magnitude and phase, respectively of the gain $G_{D/D}$, then the following relationships exist:

$$G_L \leq |G_{D/D}| \leq G_U \quad (17)$$

$$\phi_L \leq \text{angle}(G_{D/D}) \leq \phi_U \quad (18)$$

Substituting the value of $G_{D/D}$ established by equation (5) yields:

$$G_L \leq |KABR-C| \leq G_U \quad (20)$$

$$\phi_L \leq \text{angle}(KABR-C) \leq \phi_U \quad (21)$$

For variations in the circuit impedance parameter A, equations (20) and (21) can be rewritten as:

$$G_L \leq |K(A(1+\epsilon_A)BR-C| \leq G_U \quad (22)$$

$$\phi_L \leq \text{angle}(K(A(1+\epsilon_A)BR-C) \leq \phi_U \quad (23)$$

Equations (22) and (23) can be rearranged to yield:

$$\frac{G_L}{|KABR|} \leq \left|\epsilon_A + \frac{G_{D/D}}{KABR}\right| \leq \frac{G_U}{|KABR|} \quad (25)$$

and $$\phi_L - \text{angle}(KABR) \leq \text{angle}\left(\epsilon_A + \frac{G_{D/D}}{KABR}\right) \leq \quad (26)$$

$$\phi_U - \text{angle}(KABR)$$

The region established by equation (25) defines a wedge in the complex plane for $\epsilon_A$, consisting of an annulus with its center at $$\frac{-G_{D/D}}{KABR},$$

an inner radius at Z $$\frac{G_L}{|KABR|}$$

and an outer radius at $$\frac{G_U}{|KABR|}.$$

The above-described wedge intersects a sector established by equation (26) having the same center as the wedge, and defined by the angular limits $\phi_L$−angle (K A B R)23 $\phi \leq \phi_U$−angle (K A B R). Similar expressions can be derived for $\epsilon_B$, $\epsilon_K$, $\epsilon_{Z_T}$, and $\epsilon_C$.

The established parameter variation region against which the corresponding parameter of the line interface circuit under test is compared may be too wide or too tight, as compared to the conventional test limits. If the established parameter variation region is too loose, thereby giving a false positive test result, then the proposed test limits must be tightened. Conversely, if the limits are too tight, thereby giving a false negative result, then the test limits must be loosened. Thus, some iteration, using the above described circuit models, may be necessary to establish test limits that closely match the conventional test limits.

As may now be appreciated, digital testing of the line interface circuit 12₁ is accomplished by: (1) launching a digital test signal into the digital interface 18 of the line interface circuit while its analog interface 20 is terminated by the termination impedance 35, (2) analyzing the digital response values by processing them to determine the phase and magnitude, and thereafter comparing the processed values to reference values derived in the manner described. This allows for complete testing. The same line interface circuit functionality that is measured by conventional analog testing as described above with respect to equations (1)–(4) and (7)–(16) can be established by the digital test technique of the invention. Moreover, with the digital test technique of the invention, the need for an analog instrument to measure the line interface circuit analog response and the need for an analog signal generator to initiate the digital response is eliminated.

There is a further advantage to the digital test method of the invention. During their normal operation, the line interface circuits $12_1$-$12_n$ are time-division multiplexed. In other words, the digital and analog signals applied to the digital and analog interfaces 18 and 20, respectively, are applied at separate intervals, typically at intervals of 125 microseconds. Since the line interface circuits $12_1$-$12_n$ are capable of time-division multiplexed operation, the line interface circuits may also be tested by the digital test method of the invention in a time-division multiplexed manner. Thus, digital test values (comprising digitized analog signal samples) from the digital test set 34 of FIG. 1 can be applied to all the line interface circuits $12_1$-$12_n$ in succession, within each 125 microsecond interval, so as to effectively apply each digital value to each of the n circuits $12_1$-$12_n$ simultaneously to induce a digital response value at each line interface circuit. The digital response values would then be analyzed. In practice, the time required for the DSP 38 of FIG. 1 to process the responses is much shorter than the time for transmitting the responses. Thus, time-division multiplexing permits relatively rapid testing of all of the line interface circuits $12_1$-$12_n$ on a single line card 10 by way of a single digital test set 34. In this way, a single digital test set 34 can expeditiously test a single line card 10, allowing for rapid testing with a minimal capital expenditure.

As thus far described, the digital test technique of the invention may be utilized to test a single line interface circuit $12_1$ whose analog interface 20 is terminated by the termination impedance 35. However, a pair of line interface circuits, for example line interface circuits $12_i$ and $12_n$, can also be tested by digital test signals. To test the pair of line interface circuits $12_i$ and $12_n$, the analog interface 20 of one line interface circuit is coupled to the analog interface of the other. Thus, rather than terminate the analog interface 20 of each of the line interface circuits $12_i$ and $12_n$ with the termination impedance 35, each line interface circuit has its analog interface effectively terminated by the other. The pair of line interface circuits $12_i$ and $12_n$, interconnected in the manner just described, are tested by launching a digital test value into a first one of the line interface circuits $12_i$ and $12_n$ so that it produces a signal at its analog interface for input to the analog interface of the second of the line interface circuit pair. The second one of the line interface circuit pair $12_i$ and $12_n$, upon receipt of the analog signals at its analog interface, will generate digital response values at its digital interface. These digital response values are stored and thereafter processed by the digital test set to evaluate both of the line interface circuits $12_i$ and $12_n$. The digital response signals are evaluated in much the same manner as that discussed above with respect to equations (17)–(25) except that the impedance values K, A, B, R and C must now reflect the combined value associated with both of the line interface circuits $12_i$ and $12_n$.

The foregoing describes a technique for testing a line interface circuit $12_1$ by applying a digital test value to its digital interface while its analog interface is terminated, and storing and processing the digital response value generated at the digital interface.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for testing a circuit having a digital interface for receiving and transmitting digital values and an analog interface for receiving and transmitting analog signals, the analog interface coupled to the digital interface via a transmission path, comprising the steps of:

applying to the digital interface of the circuit under test at last one digital test value;

converting, within the circuit under test, the digital test value to an analog signal for transmission on the transmission path to the analog interface;

terminating the analog interface with a termination impedance chosen such that the analog signal at the analog interface causes a voltage to appear across the termination impedance that is sensed on the transmission path;

converting, within the circuit under test, the voltage sensed on the transmission path to a digital value;

storing the digital value;

processing the digital value;

comparing the processed value to a reference digital value that represents a desired operating tolerance for the circuit, as derived by modeling the circuit and determining its response to conventional testing.

2. The method according to claim 1 wherein the digital test value comprises a digitized analog signal having a spectrum content sufficient to properly characterize the transmission path in the circuit.

3. The method according to claim 1 wherein the reference signal to which the digital response signal is compared is established by mathematically modeling values representing limits on both real and imaginary components of digital gain.

4. The method according to claim 1 wherein a plurality of digital test values are applied to the digital interface in time-multiplexed fashion.

5. The method according to claim 1 wherein the digital value is processed by determining its magnitude and phase angle.

6. A method for testing a first and second circuits, each having a digital interface for receiving and transmitting digital values and an analog interface for receiving and transmitting analog signals, the analog interface coupled to the digital interface by a transmission path, the method comprising the steps of:

coupling the analog interface of the first circuit to the analog interface of the second circuit so that each circuit has its analog interface terminated by the other circuit;

applying to the digital interface of the first circuit under test at least one digital test value;

converting, within the first circuit under test, the digital test value to an analog signal for transmission on the transmission path to the analog interface of the first circuit for transmission to the analog interface of the second circuit;

converting, within the second circuit, the analog signal received from the first circuit to a digital value;

storing the digital value;

processing the digital value comparing the processed value to a reference digital value that represents a desired operating tolerance for both circuits, as derived by modeling both circuits and determining their response to conventional testing;

applying to the digital interface of the second circuit under test at least one digital test value;

converting, within the first circuit under test, the digital test value to an analog signal for transmission on the transmission path to the analog interface of the first circuit;

converting, within the second circuit, the analog signal received from the first circuit to a digital value;

storing the digital value;

processing the digital value; and comparing the processed value to a reference digital value that represents a desired operating tolerance for both circuits, as derived by modeling both circuits and determining their response to conventional testing.

7. The method according to claim 5 wherein the digital test value comprises a digitized analog signal having a spectrum content sufficient to properly characterize the transmission path in the circuit.

8. The method according to claim 5 wherein the reference signal to which the digital response signal is compared is established by mathematically modeling values representing limits on both real and imaginary components of digital gain.

9. The method according to claim 5 wherein the digital value is processed by determining its magnitude and phase angle.

* * * * *